United States Patent
Shikata et al.

(10) Patent No.: US 7,908,424 B2
(45) Date of Patent: Mar. 15, 2011

(54) MEMORY CARD AND DATA REWRITING METHOD

(75) Inventors: Atsushi Shikata, Higashimurayama (JP); Kunihiro Katayama, Chigasaki (JP); Masato Matsumoto, Akishima (JP); Kazuto Izawa, Musashino (JP); Motoki Kanamori, Tachikawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 650 days.

(21) Appl. No.: 11/802,998

(22) Filed: May 29, 2007

(65) Prior Publication Data

US 2007/0233956 A1    Oct. 4, 2007

Related U.S. Application Data

(63) Continuation of application No. 10/486,651, filed as application No. PCT/JP02/04548 on May 10, 2002, now abandoned.

(30) Foreign Application Priority Data

Sep. 13, 2001 (JP) .................................. 2001-278585

(51) Int. Cl.
*G06F 13/00* (2006.01)
*G06F 13/28* (2006.01)
(52) U.S. Cl. ........................................................ 711/103
(58) Field of Classification Search .................... 711/103
See application file for complete search history.

(56) References Cited

U.S. PATENT DOCUMENTS

| 5,126,541 | A | | 6/1992 | Shinagawa | 235/438 |
|---|---|---|---|---|---|
| 5,592,619 | A | * | 1/1997 | Shona | 726/32 |
| 5,606,660 | A | * | 2/1997 | Estakhri et al. | 714/38 |
| 5,737,582 | A | | 4/1998 | Fukuzumi | 710/310 |
| 6,266,736 | B1 | | 7/2001 | Atkinson et al. | 711/103 |
| 6,434,648 | B1 | * | 8/2002 | Assour et al. | 710/305 |
| 6,931,557 | B2 | | 8/2005 | Togawa | 713/323 |

FOREIGN PATENT DOCUMENTS

| JP | 7-44672 | 2/1995 |
|---|---|---|
| JP | 8-129629 | 5/1996 |
| JP | 11-265283 | 9/1999 |

OTHER PUBLICATIONS

Oshima, M. (ed.), "Denshi Zairyo" (Electronic Materials), Kogyo Chosakai Publishing Co., Ltd., Dec. 1, 1990, pp. 22-26.

* cited by examiner

*Primary Examiner* — Chun-Kuan Lee
(74) *Attorney, Agent, or Firm* — Miles & Stockbridge P.C.

(57) ABSTRACT

A controller 3 of a memory card is a provided with a command decoding circuit 6 for decoding commands issued by a host HT, a command enable register 8 in which the validity or invalidity of the received command, and a command detection signal generating circuit 7 for detecting a valid command on the basis of the result of decoding by the command decoding circuit 6 and a value set by the command enable register 8. If the command enable register 8 receives a validly set command, the command detection signal generating circuit 7 will supply a detection signal to a control unit 4 to execute processing prescribed for each command. the command enable register 8 receives an invalidly set command, no detection signal will be supplied, and the command will be ignored.

5 Claims, 9 Drawing Sheets

DATA FORM

FIG. 8

TYPES OF START BYTE

|  | 7 Bit Position 0 |
|---|---|
| START BYTE FOR SINGLE WRITING | 1 1 1 1 1 1 1 0 |
| START BYTE FOR MULTI-BLOCK WRITING | 1 1 1 1 1 1 0 0 |

SET FOR EACH COMMAND

| COMMAND ENABLE REGISTER | | | | | | | | |
|---|---|---|---|---|---|---|---|---|
| COMMAND No. | 0 | 1 | 2 | 3 | 4 | 5 | 6 | 7 |
| REGISTER VALUE | 1 | 1 | 1 | 1 | 1 | 0 | 0 | 1 |

REGISTER VALUE: "1" = VALID, "0" = INVALID

CORRESPONDING TO UNITS OF A FEW COMMANDS EACH

| COMMAND ENABLE REGISTER | | | |
|---|---|---|---|
| COMMAND No. | 0,1,2 | 3,4 | 5,6 |
| REGISTER VALUE | 1 | 1 | 1 |

REGISTER VALUE: "1" = VALID, "0" = INVALID

MEMORY CARD AND DATA REWRITING METHOD

CROSS-REFERENCE TO RELATED APPLICATION

This application is a continuation of application Ser. No. 10/486,651 filed Feb. 12, 2004, now abandoned which is a 371 of PCT/JP02/04548 filed May 10, 2002.

TECHNICAL FIELD

The present invention relates to a memory card, and more particularly to a technique that can be effectively applied to flexible adaptation to changes in or additions to standards of a multimedia card.

BACKGROUND ART

Multimedia cards are extensively known as one type of external storage media for use in personal computers, multi-functional terminal unit and the like. A multimedia card can be used for recording any kind of digital information such as in recording still pictures in a digital video camera, recording data in a mobile telephone or in recording music in a portable phonogram player.

The compatibility of these multimedia cards is maintained in accordance with multimedia card standards prescribed by the Multimedia Card Association (MMCA), which is an organization for standardization.

One of the detailed descriptions (in Japanese) of such IC cards is found in Masashi Oshima, ed., *Denshi Zairyo* (Electronic Materials), Kogyo Chosakai Publishing Co., Ltd., Dec. 1, 1990, pp. 22-26, which also describes technological trends regarding different kinds of IC cards.

However, the present inventors have found that a memory card of the type described above involves the following problems.

A multimedia card is a young product item having come into being along with the expanding use of the Internet and of mobile telephones, and there are frequent revisions in or additions to the multimedia card standards.

When the multimedia card standards undergo a revision or an addition, both the hardware and the firmware have to be modified accordingly, forcing the users to bear the load of a high cost and a long time.

On the host side as well, there many items of equipment which do not satisfy the multimedia card standards, and this also necessitates revision of the hardware and firmware of the multimedia card.

An object of the present invention is to provide a memory card and a data rewriting method therefore making possible adaptation to any revision in or addition to the standards at low cost and in a short period of time by merely altering the firmware.

The above-described and other objects and novel features of the invention will become more apparent from the following description in this specification when taken in conjunction with the accompanying drawings.

DISCLOSURE OF THE INVENTION

1. A memory card according to the present invention has a controller, and the controller comprises: a command decoding unit for decoding externally issued commands; an index setting unit in which the validity or invalidity is set for the index of each of said externally issued commands; and a command detection signal generating unit for judging whether each of the externally issued commands is valid or invalid on the basis of the result of decoding by the command decoding unit and a value set by the index setting unit, and supplying the result as a detection signal.

2. Further in the first paragraph, the index setting unit is a register, and the setting of the validity or invalidity of each command can be altered as desired on the basis of firmware data.

3. The controller comprises: a command decoding unit for decoding externally issued commands, judging the index of each of the commands, and supplying a decoded signal to a prescribed destination; an index setting unit in which the validity or invalidity of each of the commands is set for each index; and a command detection signal generating unit for identifying from the decoded signal from the command decoding unit the index of the externally issued command, judging the validity or invalidity of the command of the identified index from data set in the index setting unit and, if the command is valid, executing response processing matching the command and supplying a detection signal to have processing prescribed by the command executed.

4. In any of the first through third paragraphs above, the controller comprises: a data detecting unit for detecting externally entered data forms; a data form setting unit in which data indicating the validity or invalidity of the externally entered data form is set for each data form; and a data detection signal generating unit for judging the validity or invalidity of the externally issued data on the basis of the result of detection by the data detecting unit and a value set by the data form setting unit, and supplying the result as a detection signal.

5. In the memory card according to the fourth paragraph, the data form setting unit is a register, and the setting of the validity or invalidity of each data form can be altered as desired on the basis of firmware data.

Another aspect of the invention under the present application will be summarized below in an itemized way.

1. A data writing method for memory cards comprising the steps of:
(a) accepting a command requesting firmware data to be written in from outside and receiving command firmware data to be written in;
(b) writing the received firmware data into a certain area in the nonvolatile semiconductor memory;
(c) setting, after initialization of the memory card, initial data of an index setting unit; memory card;
(d) accessing the nonvolatile semiconductor memory to check the presence or absence of firmware data; and
(e) in the presence of firmware data in the nonvolatile semiconductor memory, reading in the firmware data, and writing and newly setting data in the index setting unit on the basis of the firmware data.

2. A data writing method for memory cards comprising the steps of:
(a) accepting a command requesting firmware data to be written in from outside and receiving command firmware data to be written in;
(b) writing the received firmware data into a certain area in the nonvolatile semiconductor memory;
(c) setting, after initialization of the memory card, initial data of a data form setting unit; memory card;
(d) accessing the nonvolatile semiconductor memory to check the presence or absence of firmware data; and
(e) in the presence of firmware data in the nonvolatile semiconductor memory, reading in the firmware data, and writing and newly setting data in the data form setting unit on the basis of the firmware data.

BEST MODES FOR CARRYING OUT THE INVENTION

The present invention will be described in detail below with reference to the accompanying drawings. In all the drawings, elements having the same functions will be denoted by respectively the same reference signs, and the duplication of their description will be omitted.

In one of the modes for carrying out the invention, a memory card 1 consists of a multimedia card, and used as an external storage medium of a host HT in a digital video camera, mobile telephone, portable phonogram player or personal computer.

Figure 1:
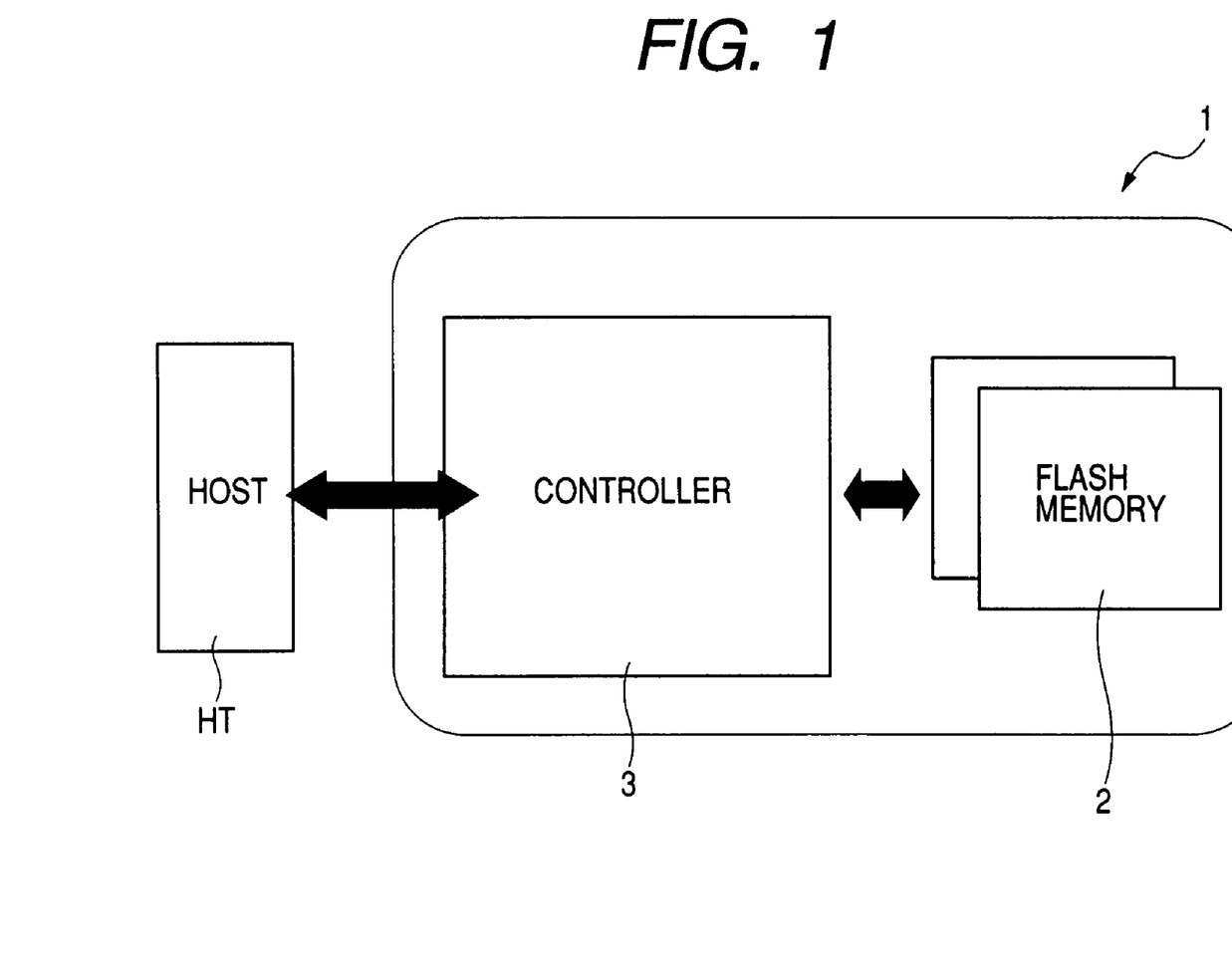
FIG. 1 is a block diagram of a memory card in one mode for carrying out the present invention.

The memory card 1, as shown in FIG. 1, consists of a flash memory (nonvolatile semiconductor memory) 2 and a controller 3. The flash memory 2 is a nonvolatile semiconductor memory permit electrical rewriting and erasion of data.

The controller 3, connected to the host HT, takes charge of control of the flash memory 2, reads out programs and data stored in the flash memory 2 to subject them to prescribed processing, and instructs writing of data.

Figure 2:
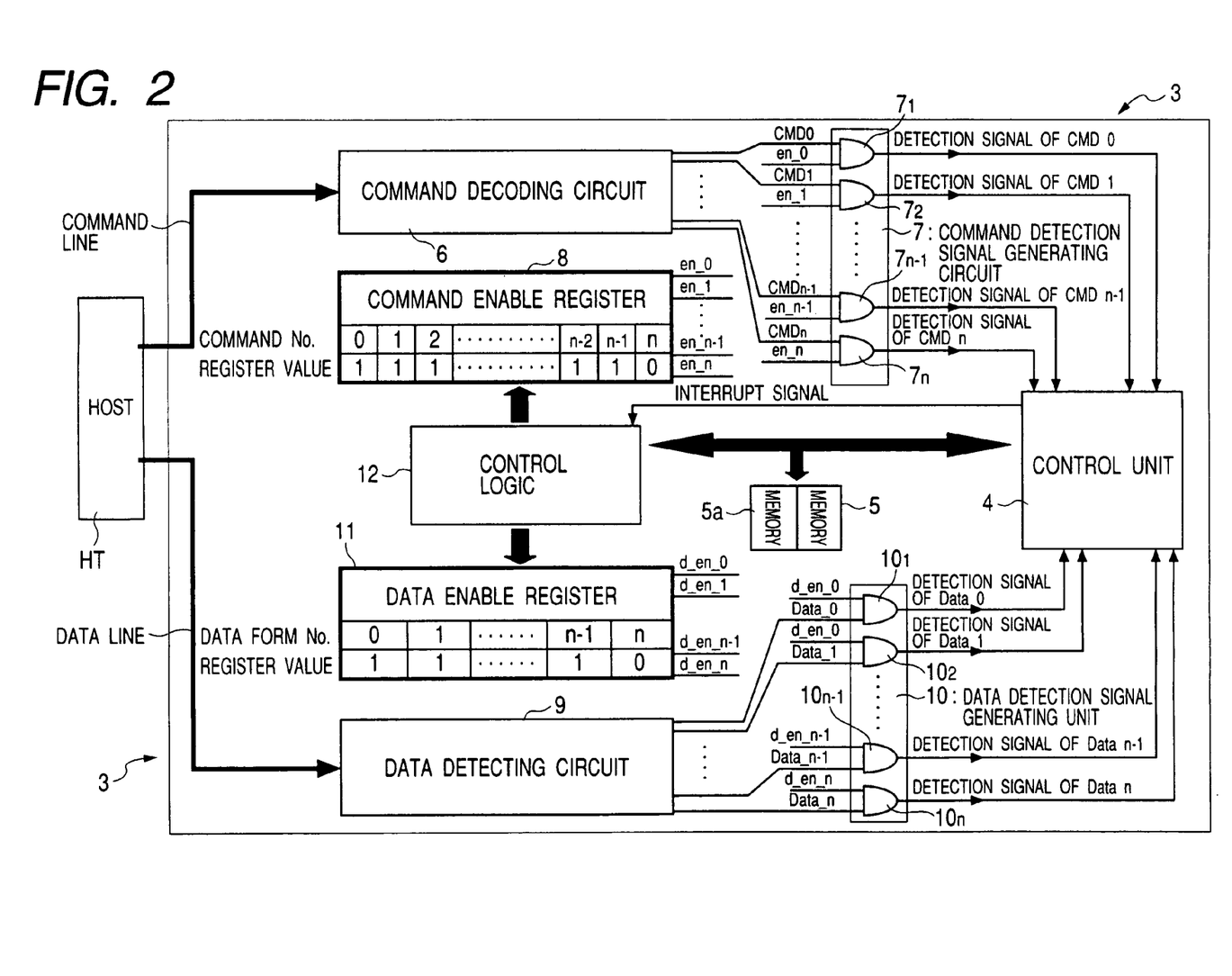
FIG. 2 is a block diagram of a controller provided in the memory card of FIG. 1.

Further, the controller 3, as shown in FIG. 2, comprises a control unit 4, memories 5 and 5a, a command decoding circuit (command decoding unit) 6, a command detection signal generating circuit (command detection signal generating unit, a register) 7, a command enable register (index setting unit) 8, a data detecting circuit (data detecting unit) 9, a data detection signal generating circuit (data detection signal generating unit) 10, a data enable register (data form setting unit) 11, and a control logic 12.

The control unit 4 judges whether given command and data form are valid or invalid on the basis of detection signal supplied from a command detection signal generating circuit 7 and a data detection signal generating circuit 10. If they are found valid, it executes predetermined response processing and processing prescribed for each command, at the same time supplies an interrupt signal to the control logic 12 to inform it of the reception of the command, and processes a data transfer and other operations under the control of the control logic 12.

The memory 5 is a nonvolatile memory such as a read only memory (ROM) or an electrically erasable and programmable ROM (EEPROM), and the memory 5a is a volatile memory such as a static random access memory (SRAM).

In the memory 5 is stored a control program for operating the control logic 12 and the like, and the memory 5a is used as a work area for the control logic 12.

The command decoding circuit 6 decodes commands CMD0 through CMDn transmitted from the host HT, and supplies the results of decoding to the command detection signal generating circuit 7. These commands CMD0 through CMDn issued by the host HT cover all the manners of processing instructed to the memory card 1 including recognition of the card, read, write and erase.

The command detection signal generating circuit 7 consists of AND circuits $7_1$ through $7_n$, and these AND circuits $7_1$ through $7_n$ are provided to respectively match the commands CMD0 through CMDn. The command decoding circuit 6 supplies the results of decoding by any of the commands CMD0 through CMDn to the matching one of the AND circuits $7_1$ through $7_n$.

To one input section of each of the AND circuits $7_1$ through $7_n$ is connected the command decoding circuit 6. The command decoding circuit 6 supplies its output, on the basis the results of decoding of any of the commands CMD0 through CMDn, to the matching one of the AND circuits $7_1$ through $7_n$.

The other input section of each of the AND circuits $7_1$ through $7_n$ is so connected that register data set in the command enable register 8 be entered.

The command detection signal generating circuit 7 computes with the AND circuits $7_1$ through $7_n$ the logical products of decoded signals from the command decoding circuit 6 and the register data set in the command enable register 8, and supplies the control unit 4 with the detection signal of the pertinent command.

The command enable register 8 stores and sets in advance as register data for each individual command index whether a command issued by the host HT is valid or invalid. In this case, a Hi signal is set for every valid command.

The data detecting circuit 9 detects a data form issued by the host HT by a serial transfer, and supplies it to the data detection signal generating circuit 10. The data detection signal generating circuit 10 consists of n AND circuits $10_1$ through $10_n$.

To one input section of each of the AND circuits $10_1$ through $10_n$ is connected the data detecting circuit 9, and the data detecting circuit 9 supplies a signal of detection result to the matching one of the AND circuits $10_1$ through $10_n$.

The other input section of each of the AND circuits $10_1$ through $10_n$ is so connected that register data set in the data enable register 11 be entered.

The data detection signal generating circuit 10 computes with the AND circuits $10_1$ through $10_n$ the logical products of decoded signals from the data detecting circuit 9 and the register data set in the data enable register 11, and supplies the control unit 4 with a detection signal in the pertinent data form.

In the data enable register 11, which can set register data matching data forms No. 0 through No. n, it is set in advance as register data for each individual data form whether a data form received from the host HT is valid or invalid. Here again, a Hi signal is set for every valid command.

The control logic 12, taking charge of control to set register data in the command enable register 8 and the data enable register 11, also takes charge of every control in the controller 3.

Next will be described actions that take place in the memory card 1 in this mode for carrying out the invention.

First will be described with reference to FIG. 3 the operation of the memory card when a command set to be valid in the command enable register 8 is entered from the host HT. In this FIG. 3, as it is a diagram illustrating the operation at the time a command is entered, the data detecting circuit 9, the data detection signal generating circuit 10 and the data enable register 11 are omitted.

Figure 3:
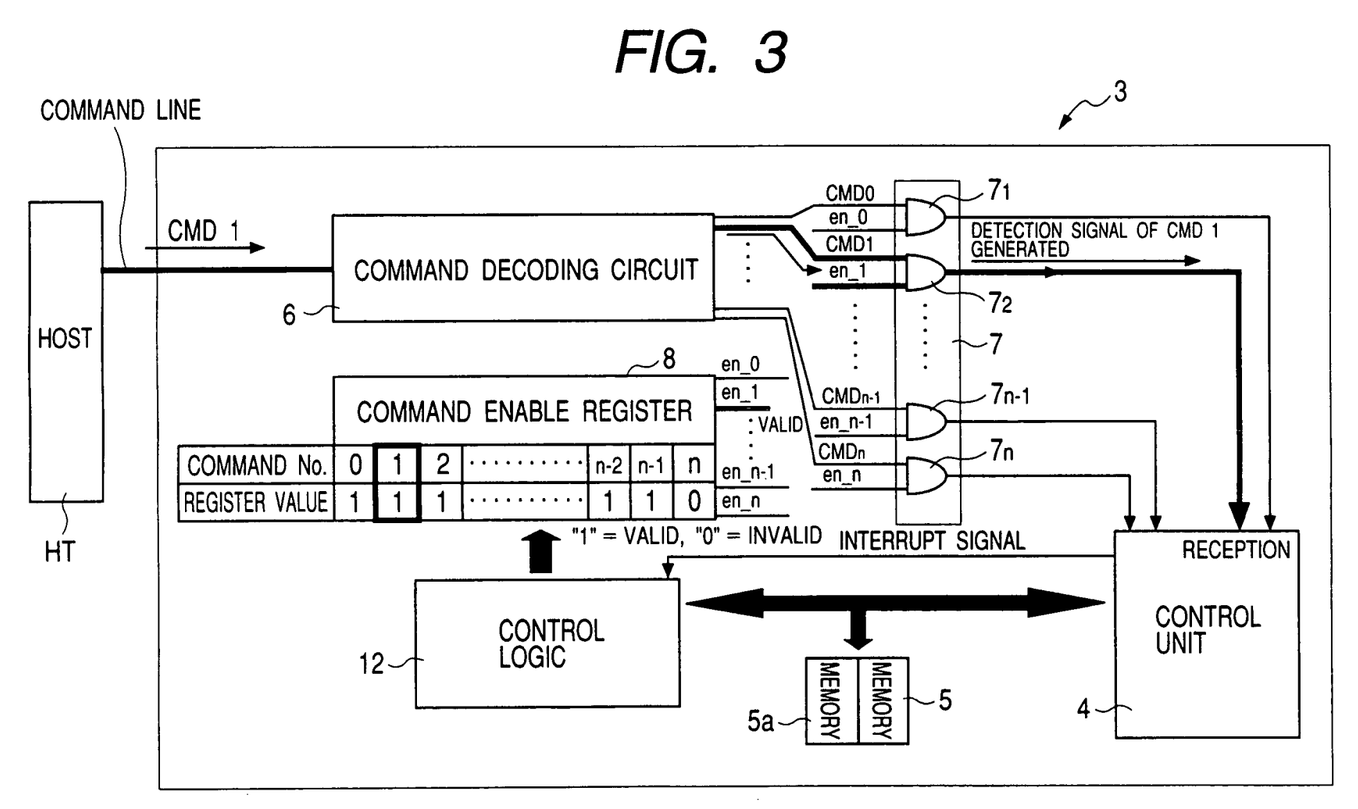
FIG. 3 illustrates the operation of the controller when it has received a command set to be valid in a command enable register provided in the memory card of FIG. 1.

Further in FIG. 3, it is supposed that the register data of the command enable register 8 are so set in advance that the commands CMD0 through CMDn−1 to be valid (Hi) and the command CMDn to be invalid (Lo).

As shown in FIG. 3, when a command CMD1 is transferred from the host HT, this command CMD1 is entered into the command decoding circuit 6. The command decoding circuit 6 decodes the received command CMD1, and supplies the signal (Hi) of the result of decoding to one input section of the AND circuit $7_2$ of the command detection signal generating circuit 7 matching the command CMD1.

As stated above, since the commands CMD0 through CMDn−1 are set to be valid (Hi) and the command CMDn to be invalid (Lo) in the command enable register 8, a Hi signal is entered into the other input section of each of the AND circuits $7_1$ through $7_{n-1}$ of the command detection signal generating circuit and a Lo signal into the other input section of the AND circuit $7_n$.

Therefore, a Hi signal is entered into each of the two input sections of the AND circuit $7_2$, and from the AND circuits $7_2$ is supplied a signal of the Hi level as the detection signal. Since no Hi signal is entered into any of the other AND circuits $7_1$ through $7_{n-1}$, they supply Lo signals.

When the control unit 4 receives the detection signal of the AND circuit $7_2$, the control unit 4 supplies an interrupt signal to the control logic 12 and, having received the interrupt signal, the control logic 12 executes response processing matching the command CMD1 and processing prescribed by the command CMD1.

Next will be described with reference to FIG. 4 the operation of the memory card 1 when a command set to be invalid in the command enable register 8 is entered from the host HT. In this FIG. 4 again, as it is a diagram illustrating the operation at the time a command is entered, the data detecting circuit 9, the data detection signal generating circuit 10 and the data enable register 11 are omitted.

Figure 4:
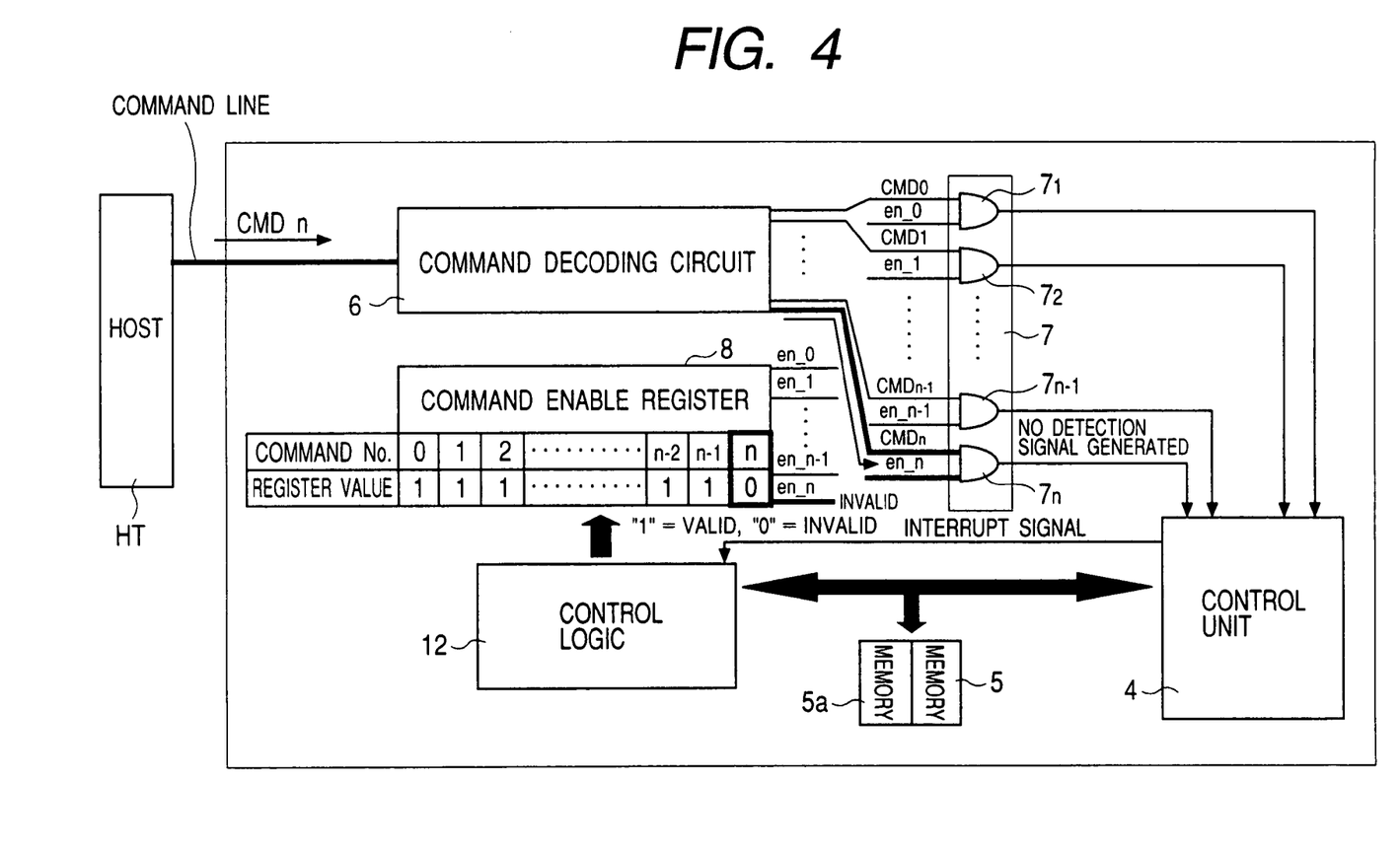
FIG. 4 illustrates the operation of the controller when it has received a command set to be invalid in a command enable register provided in the memory card of FIG. 1.

Further in FIG. 4, too, it is supposed that the register data of the command enable register 8 are so set in advance that the commands CMD0 through CMDn−1 to be valid (Hi) and the command CMDn be invalid (Lo).

As shown in FIG. 4, when a command CMDn is transferred from the host HT, the command CMDn is entered into the command decoding circuit 6. The command decoding circuit 6 decodes the received command CMDn, and supplies a Hi signal to one input section of the AND circuit $7_n$ of the command detection signal generating circuit 7 matching the command CMDn.

Here again, since the commands CMD0 through CMDn−1 are set to be valid (Hi) and the command CMDn to be invalid (Lo) in the command enable register 8, a Hi signal is entered into the other input section of each of the AND circuits $7_1$ through $7_{n-1}$ of the command detection signal generating circuit and a Lo signal into the other input section of the AND circuit $7_n$.

A Hi signal is entered into only one input section of the AND circuit $7_n$, and no detection signal is supplied from the AND circuit $7_2$, with a Lo signal continuing to be supplied. Similarly in any of the other AND circuits $7_1$ and $7_3$ through $7_n$, a Lo signal continues to be supplied as no Hi signal is entered into one of the input sections.

Therefore, since no detection signal is entered into the control unit 4, the control logic 12 ignores the entered command CMDn, and eventually the command CMDn is invalidated.

Further will be described the alteration of setting in/the command enable register 8 between valid and invalid for the commands CMD1 through CMDn.

Figure 5:
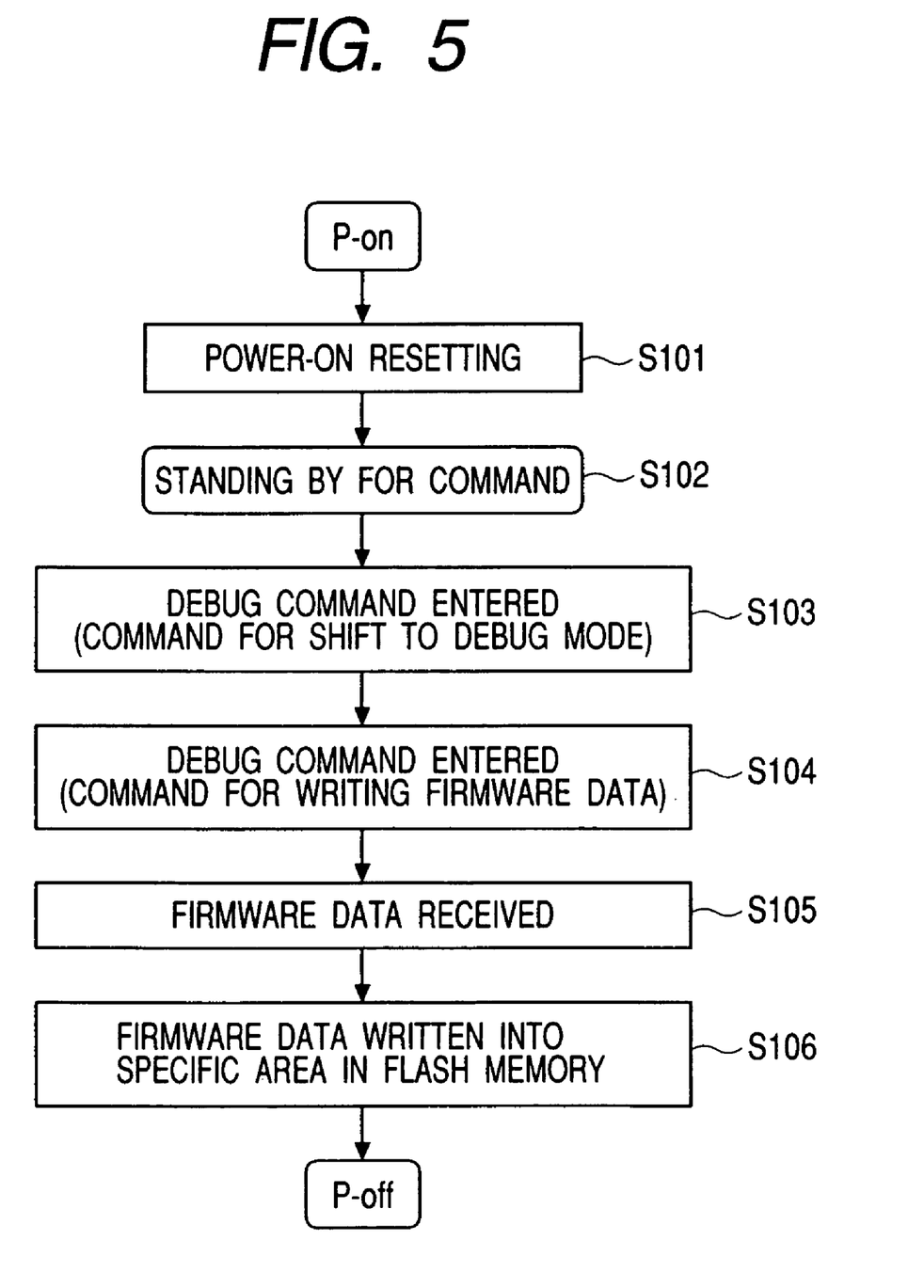
FIG. 5 is a flow chart showing the write sequence of firmware to alter the setting in the memory card of FIG. 1.

Writing into firmware for this alteration of setting in the command enable register 8 will now be described with reference to the flow chart of FIG. 5.

First, the memory card 1 before shipment as a product is mounted on an emulator, and a source voltage is fed to it. This causes the memory card 1 to undergo power-on resetting as initialization (step S101). In the processing at this step S101, initial register data are set in the command enable register 8.

Upon completion of the power-on resetting, the memory card 1 enters into a state of standing by for a command (step S102).

Then a debug command for use in rewriting or fault analysis of system information in the memory card is issued from the emulator (step S103), and the memory card is shifted to a debug mode.

After that a command for data writing into the firmware is issued from the emulator (step S104), and firmware data including the altered register data are supplied on a module-by-module basis.

Upon reception by the memory card 1 of firmware data including the altered register data (step S105), the control logic 12 writes the received firmware data into a specific area in the flash memory 2 (step S106), and the writing of firmware data is thereby completed.

Figure 6:
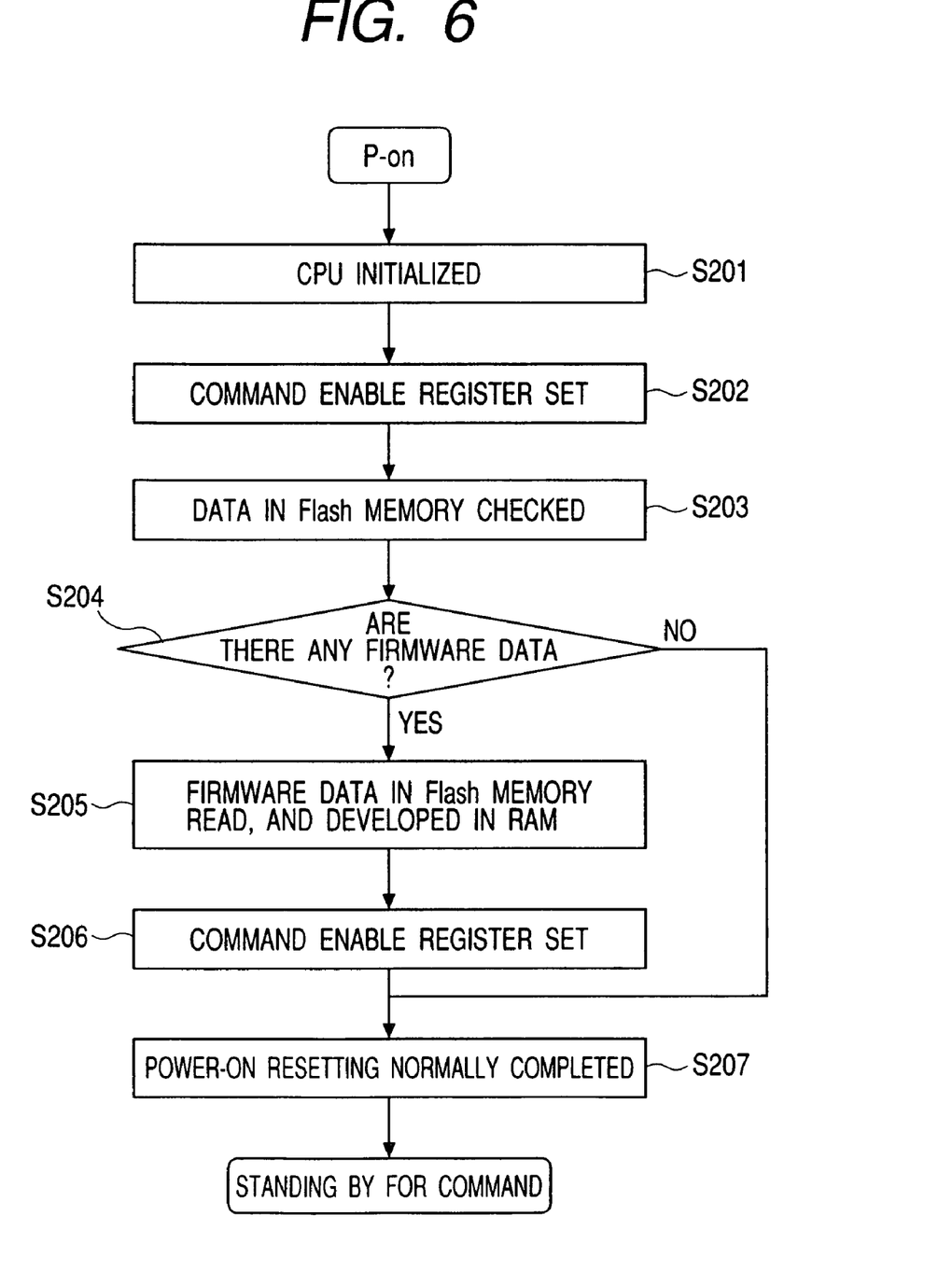
FIG. 6 is a flow chart of the sequence of operations to alter the setting of register data in the command enable register in the memory card of FIG. 1.

Next will be described the alteration of register data setting in the command enable register 8 with reference to the flow chart of FIG. 6.

When power supply to the memory card 1 is turned on, the control logic 12 is initialized (step S201). After that, on the basis of firmware data stored in each memory, register data in the command enable register 8 are initialized (step S202).

Then the control logic 12 searches a specific area in the flash memory 2 to check the presence or absence of any firmware (step S203). If any firmware is found in the searched specific area in this processing at step S203, that firmware is read in and temporarily stored into the memory 5a (step S204).

The control logic 12 newly sets register data of the command enable register 8 on the basis of the firmware data stored into the memory 5a (step S205), and completes the power-on resetting (step S206).

Even if no firmware is found in the specific area in the processing of step S203, processing at step S206 is also performed.

These steps of processing completes the power-on resetting and the register data are altered, placing the memory card 1 in a state of standing by for a command.

Further will be described the judgment as to a serially transferred data form is valid or invalid according to the register data set in the data enable register 11.

Figure 7:
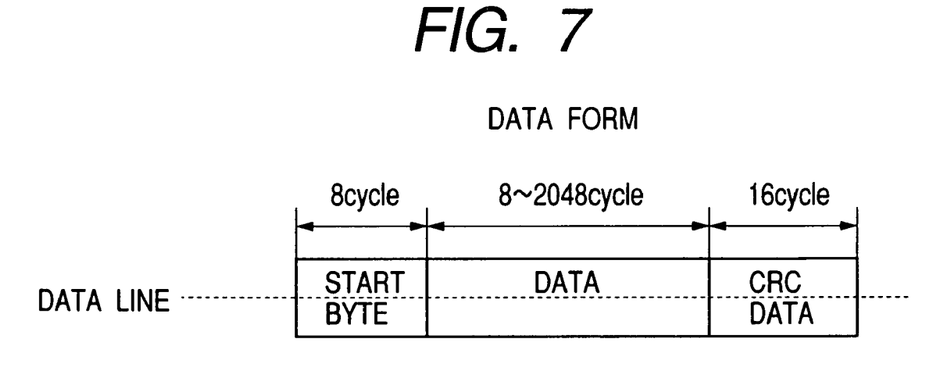
FIG. 7 illustrates the configuration of data serially transferred to the memory card of FIG. 1.

First, the serial data to be transferred consist, as shown in FIG. 7, of a start byte, data of 8 to 2048 bits and cycle redundancy codes (CRC) data of 16 bits.

Figure 8:
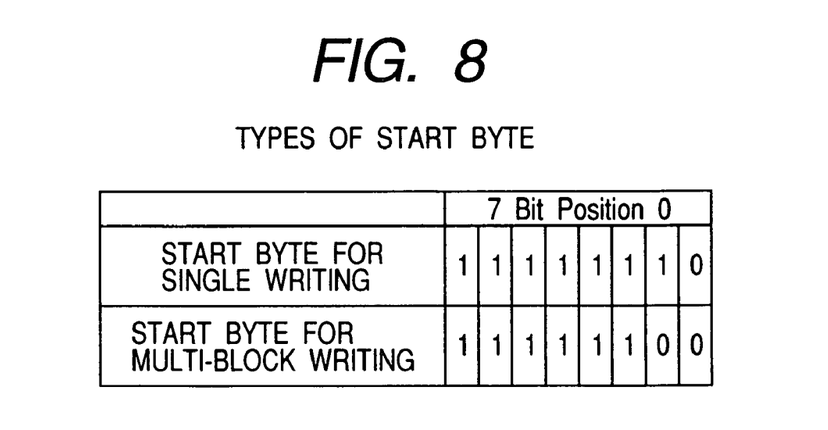
FIG. 8 illustrates examples of start byte in the data of FIG. 7.

The start byte is a datum indicating the start of a data transfer. This start byte, as shown in FIG. 8, is separately set for the data form for single-block writing which allows the transfer of one block per command and that for multi-block writing which allows the transfer of a plurality of blocks per command.

It is supposed, for instance, that out of the data forms No. 0 through No. n in the data enable register 11, single-block writing is allocated for the data form No. 0 and multi-block writing for the data form No. 1.

If in this case the register data of both the data form No. 0 and the data form No. 1 are set for a Hi signal, both single-block writing and multi-block writing are validly set.

If then the start byte of the data form No. 1 is transferred from the host HT, the data detecting circuit 9 will supply the signal (Hi) of the result of decoding to one of the input sections of the AND circuit $10_2$ of the data detection signal generating circuit 10 matching the data form No. 1.

Since the data form No. 1 is set validly (Hi) in the command enable register 8 as stated above, the AND circuit $10_2$ supplies a detection signal (Hi) indicating the detection of the data form No. 1. Upon reception of the detection signal by the control unit 4, the control logic 12 receives data transferred from the host HT and subjects them to prescribed processing.

If the register data in the data enable register 11 matching the data form No. 1 are set to be invalid (Lo), even if the start byte of the data form No. 1 is transferred from the host HT, the AND circuit $10_2$ of the data detection signal generating circuit 10 will supply a Lo signal, and therefore the control logic 12 will not accept data transferred from the host HT.

Also the setting of the register data in this data enable register 11 can be altered by the above-described processing at steps S101 through S106 and steps S201 through S207.

In this way, by only altering the register data in the command enable register 8 and the data enable register 11 with firmware data, the validity or invalidity of each of commands and data forms can be set in this mode for carrying out the invention, and accordingly any change in or addition to the multimedia card standards can be flexibly coped with.

Also, since any change in or addition to the multimedia card standards would necessitate no alteration in the hardware of the memory card 1, the memory card 1 can be introduced to the market at low cost and in a short period of time.

Furthermore, the memory card 1 in the above-described mode for carrying out the invention permits setting of the validity or invalidity of each of commands and data forms, the memory card 1 can as well be provided with not only a function to set the validity or invalidity of these commands and data forms but also a function to select a response in the format prescribed for each command to be returned to the host HT.

Figure 9:
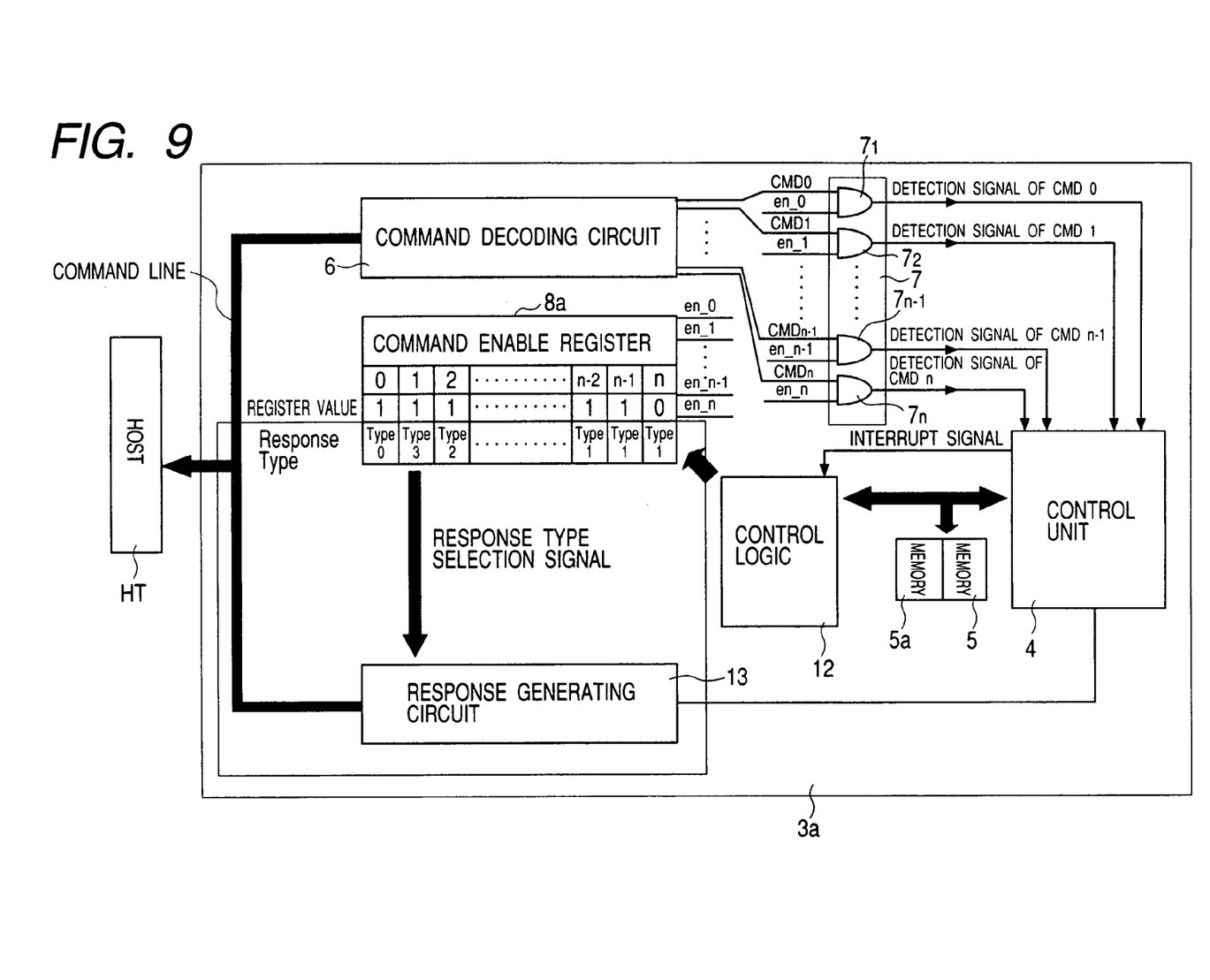
FIG. 9 illustrates the operation of the controller provided in a memory card in another mode for carrying out the invention.

In this case, a controller 3a of the memory card 1, as shown in FIG. 9, has a configuration involving the addition of a response generating circuit 13. Furthermore, a command enable register 8a is additionally provided with a function to set a response type selection signal for selection the type of response matching each command index. Here in this FIG. 9, the illustration of the data detecting circuit 9, the data detection signal generating circuit 10 and the data enable register 11 is omitted.

The response generating circuit 13 generates a response matching each of the command indexes on the basis of a response type selection signal set in the command enable register 8a, and returns it to the host HT.

The response generating circuit 13 generates from a response type selection signal of, for instance two bits, a matching response, and returns it to the host HT. It is supposed here that there are available alternatives of responses Type 0 through Type 3, for instance, for the response to be returned to the host HT, and '00' is set for the response Type 0, '01' for the Type 1, '10' for the response Type 2 and '11' for the response Type 3.

When a valid command CMD1 is entered into the host HT, the response generating circuit 13 reads out a response type selection signal matching the command CMD1 under the control of the control logic 12.

The response generating circuit 13 having read out the response signal '11' generates a response of Type 3 matching the command CMD1, and returns it to the host HT.

In this way, by only altering the response type selection signal of the command enable register 8a, any addition to or change in the response processing that the memory card 1 can accomplish can be flexibly coped with.

Further, a register for restraining the occurrence of interrupt signals to the control logic 12 can be added to enable their occurrence in respect of each command.

This would make possible, though a response to any command is returned, prevention of internal operation under the control of the control logic.

Although the invention made by the present inventors has been described in specific terms with reference to the best modes for carrying it out, obviously the invention is not confined to these modes, but can be varied in many different ways without deviating from its essentials.

While the configurations in these modes for carrying out the invention, register data are to be set for each individual command, validity or invalidity can as well be set for each class of commands, such as basic commands, erase commands, read command and write commands.

Figure 10:
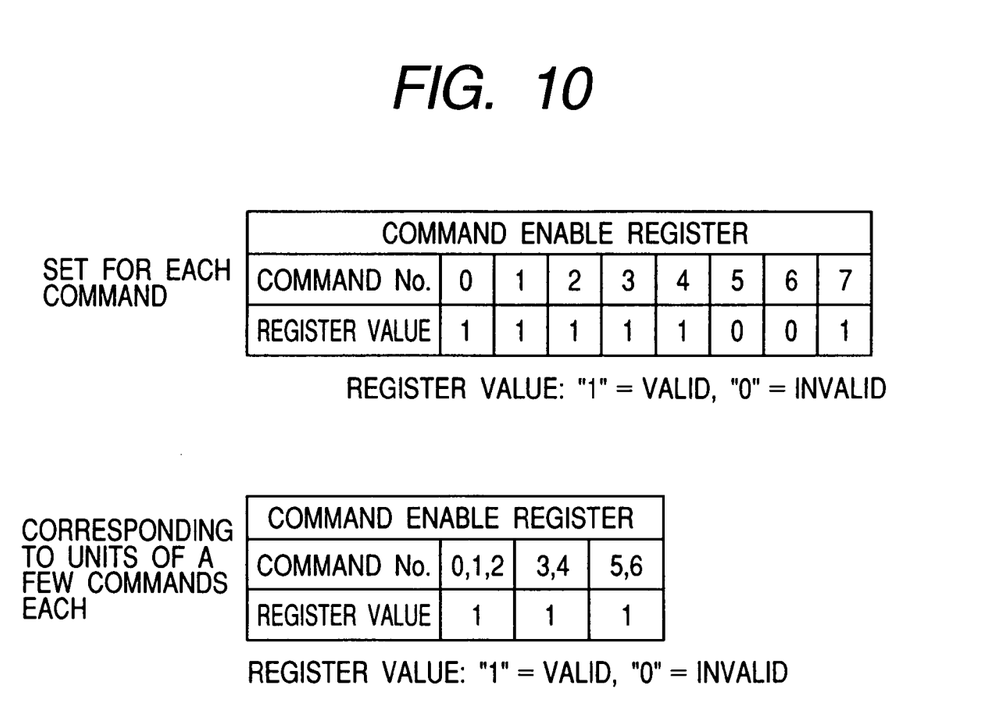
FIG. 10 illustrates examples of register data set in the command enable register of the memory card in the other mode for carrying out the invention.

For instance, where there are commands CMD0 through CMD6, though in the above-described modes, register data of validity (Hi) or invalidity (Lo) are separately set for the commands CMD0 through CMD6 as shown in the upper half of FIG. 10, register data of validity or invalidity may as well be set collectively for commands CMD0 through CMD2, commands CMD3 and CMD4, and commands CMD5 and CMD6 as shown in the lower half of FIG. 10.

This would enable the scale of circuitry to be compressed by reducing the number of registers, thereby saving the cost of the memory card 1 and simplifying the setting of firmware data.

It is also conceivable to store in the memory, in which control programs and the like are stored, processing programs for commands not supported by default, and alter the setting of register data in the command enable register by a predetermined host command.

This would make it possible to add commands or support commands for dedicated use by the host without having to alter firmware data.

INDUSTRIAL APPLICABILITY

As hitherto described, the memory card and data rewriting method according to the present invention is suitable for use in simplified techniques to adapt memory cards to any change in or addition to the applicable standards.

The invention claimed is:
1. An apparatus comprising:
a first nonvolatile memory, which includes a plurality of nonvolatile memory cells storing predetermined information; and
a controller giving operational instructions to the first nonvolatile memory in accordance with externally issued commands, wherein the controller comprises:

a command decoding unit decoding externally issued commands including a first command and a second command;

a command enable register storing a commmand validity value or a command invalidity value for each of the first command and the second command and storing a response type for each of the first command and the second command;

a command detecting signal generating circuit providing a command detection signal when a command detected by the command detecting unit is enabled by the command enable register;

a second nonvolatile memory storing first firmware to be executed by the controller, wherein the command validity value or the command invalidity value for each of the first command and the second command is set in the command enable register by the controller executing the first firmware so that the first command is enabled by the command validity value, and the second command is disabled by the command invalidity value, and wherein the response type for each of the first command and the second command is set by the controller executing the first firmware;

a data detecting unit detecting a data form of externally entered data;

a data enable register storing a data validity value or a data invalidity value of the data form, wherein the data form includes a first data form and a second data form, wherein the data validity value or the data invalidity value of each of the first data form and the second data form is set in the data enable register by the controller executing the first firmware so that the first data form is enabled by the data validity value and the second data form is disabled by the data invalidity value;

a data detection signal generating unit providing a detection signal when the data form detected by the data detecting unit is enabled by the data enable register;

a response generating unit providing, to an outside of the apparatus, a response according to the response type of the detected command when the detected command is enabled by the command enable register;

wherein the command validity value or the command invalidity value and the data validity value or the data invalidity value settings for the command enable register and the data enable register, respectively, are altered based on execution of second firmware stored in the first nonvolatile memory so that the first command and the second command are enabled, and the first data form and the second data form are enabled, and wherein the altering of the command validity value or the command invalidity value and the data validity value or the data invalidity value settings for the command enable register and the data enable register, respectively, is performed by the controller executing the second firmware.

2. The apparatus according to claim 1,
wherein the controller does not respond to the second command based on the command invalidity value of the second command in the command enable register when the command invalidity value of the second command is set in the command enable register.

3. The apparatus according to claim 1,
wherein the command decoding unit receives the command validity value from the command enable register, and
wherein the response generating unit receives the response type from the command enable register.

4. The apparatus according to claim 1, wherein said first nonvolatile memory is flash memory.

5. The apparatus according to claim 1, wherein the first nonvolatile memory is a semiconductor memory.

* * * * *